US012568384B2

(12) United States Patent
Rahn et al.

(10) Patent No.: US 12,568,384 B2
(45) Date of Patent: Mar. 3, 2026

(54) BOOTSTRAPPING AND TROUBLESHOOTING OF REMOTE DEVICES

(71) Applicant: Arista Networks, Inc., Santa Clara, CA (US)

(72) Inventors: Ethan Barnett Rahn, Thousand Oaks, CA (US); Udayakumar Srinivasan, Santa Clara, CA (US); Aparna Sushrut Karanjkar, Santa Clara, CA (US); Douglas Alan Gourlay, San Francisco, CA (US); Kim Ringeisen, Santa Clara, CA (US)

(73) Assignee: Artist Networks, Inc., Santa Clara, CA (US)

( * ) Notice: Subject to any disclaimer, the term of this patent is extended or adjusted under 35 U.S.C. 154(b) by 569 days.

(21) Appl. No.: 17/583,313

(22) Filed: Jan. 25, 2022

(65) Prior Publication Data

US 2023/0063515 A1     Mar. 2, 2023

Related U.S. Application Data

(60) Provisional application No. 63/239,555, filed on Sep. 1, 2021.

(51) Int. Cl.
*H04L 9/32*          (2006.01)
*H04L 9/40*          (2022.01)
           (Continued)

(52) U.S. Cl.
CPC ......... *H04W 24/02* (2013.01); *H04L 63/0876* (2013.01); *H04W 12/03* (2021.01);
           (Continued)

(58) Field of Classification Search
CPC ..... H04W 24/02; H04W 76/30; H04W 76/10; H04W 12/062; H04W 12/63; H04W 12/03; H04L 63/0876
See application file for complete search history.

(56) References Cited

U.S. PATENT DOCUMENTS

| | | | | |
|---|---|---|---|---|
| 11,528,185 B1 * | 12/2022 | Hrbek | ................ | H04L 41/0873 |
| 2008/0058014 A1 * | 3/2008 | Khan | ................ | H04L 63/0853 |
| | | | | 455/558 |

(Continued)

FOREIGN PATENT DOCUMENTS

| | | | | |
|---|---|---|---|---|
| CN | 102761613 | A | * | 6/2012 |
| CN | 108847938 | A | * | 11/2018 |

(Continued)

*Primary Examiner* — Haresh N Patel
(74) *Attorney, Agent, or Firm* — Tianyi He

(57)          ABSTRACT

A method for remotely configuring a network device using a user device and a network management service is provided. The user device includes a first communication interface and a second communication interface, and the method includes: initiating, by the user device, a communication channel with the network device using the second communication interface; after the communication channel is established: obtaining, by the user device via the first communication interface, configuration information for the network device from the network management service; and sending, by the user device, the configuration information to the network device via the communication channel. The user device is in communication with the network management service via the first communication interface, and the user device is configured as a pass-through device that relays the configuration information from the network management service to the network device.

20 Claims, 10 Drawing Sheets

(51) Int. Cl.
| | |
|---|---|
| *H04W 12/03* | (2021.01) |
| *H04W 12/062* | (2021.01) |
| *H04W 12/63* | (2021.01) |
| *H04W 24/02* | (2009.01) |
| *H04W 76/10* | (2018.01) |
| *H04W 76/30* | (2018.01) |

(52) U.S. Cl.
CPC ......... *H04W 12/062* (2021.01); *H04W 12/63* (2021.01); *H04W 76/10* (2018.02); *H04W 76/30* (2018.02)

(56) References Cited

U.S. PATENT DOCUMENTS

| | | | |
|---|---|---|---|
| 2015/0038129 A1 | 2/2015 | Sundareswaran et al. | |
| 2019/0132396 A1* | 5/2019 | Finnegan ............ | H04L 12/2818 |
| 2019/0387492 A1* | 12/2019 | Kulkarni ............ | H04L 41/0806 |
| 2020/0204538 A1* | 6/2020 | Friel ................... | H04L 63/0876 |

FOREIGN PATENT DOCUMENTS

| | | | | | |
|---|---|---|---|---|---|
| CN | 113691984 | A | * | 11/2021 | |
| CN | 114173309 | A | * | 3/2022 | ............ G06F 21/32 |
| EP | 2434789 | A1 | | 3/2012 | |
| EP | 2874465 | A1 | | 5/2015 | |
| EP | 3674949 | A1 | * | 7/2020 | ......... H04L 61/5014 |
| JP | 2014235574 | A | * | 12/2014 | ......... G06Q 30/0255 |
| KR | 20060045195 | A | * | 5/2006 | |
| TR | 201517576 | A2 | * | 7/2016 | |
| WO | WO-2016133369 | A1 | * | 8/2016 | .............. G06K 9/18 |
| WO | WO-2020081703 | A1 | * | 4/2020 | .............. H04W 4/80 |
| WO | WO-2022159246 | A1 | * | 7/2022 | |

* cited by examiner

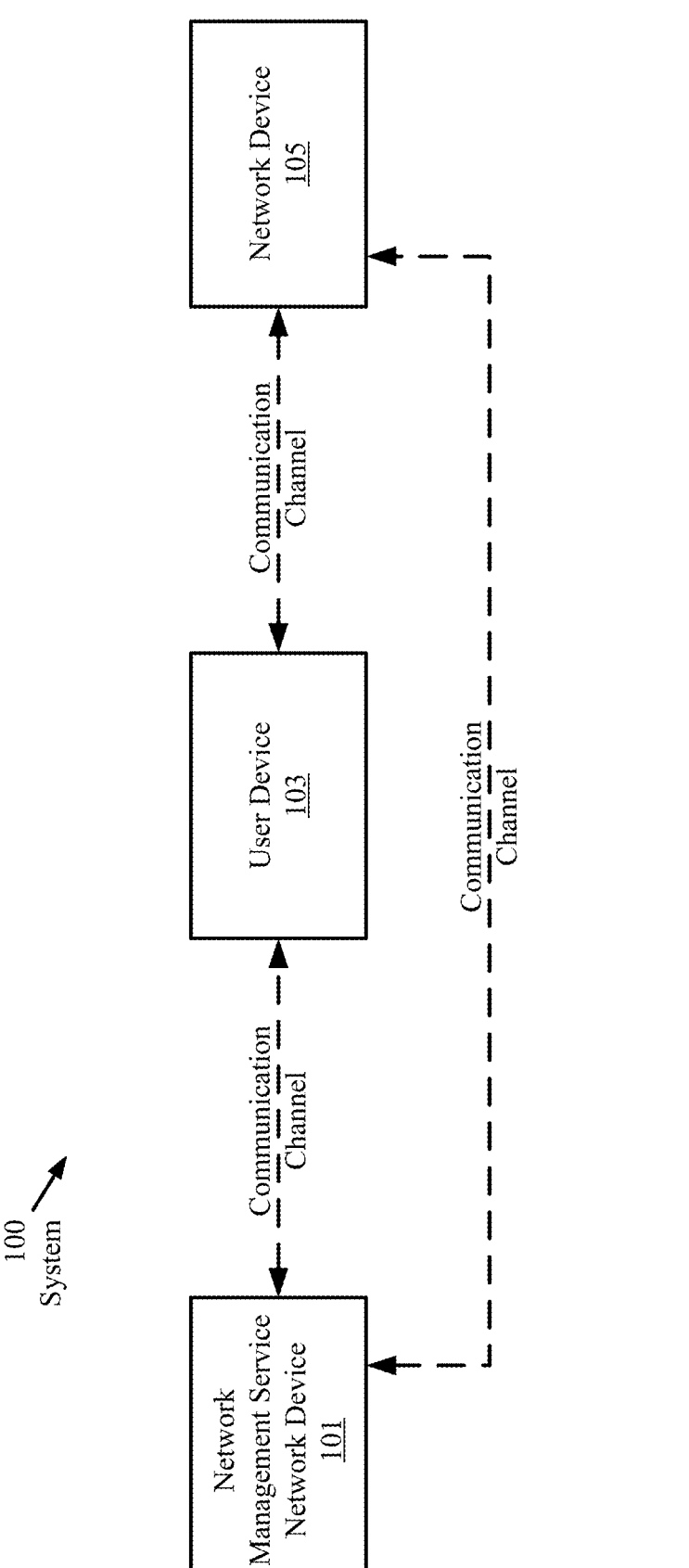
FIG. 1.1

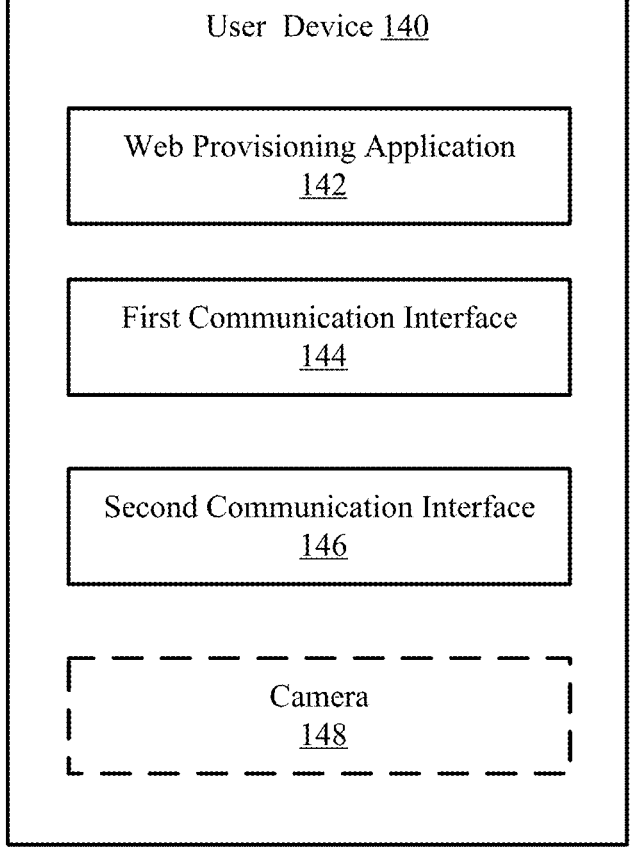
FIG. 1.2

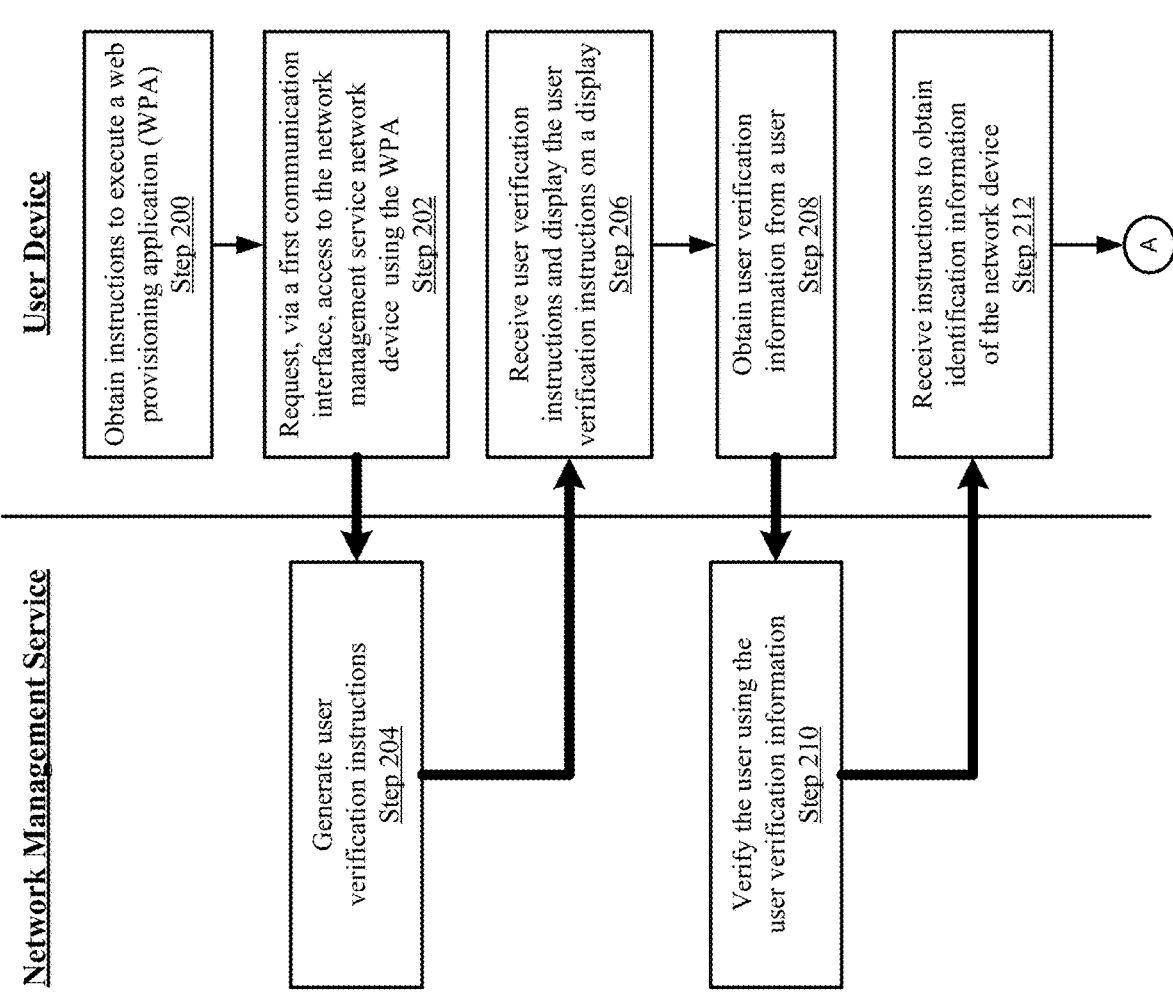
FIG. 2.1

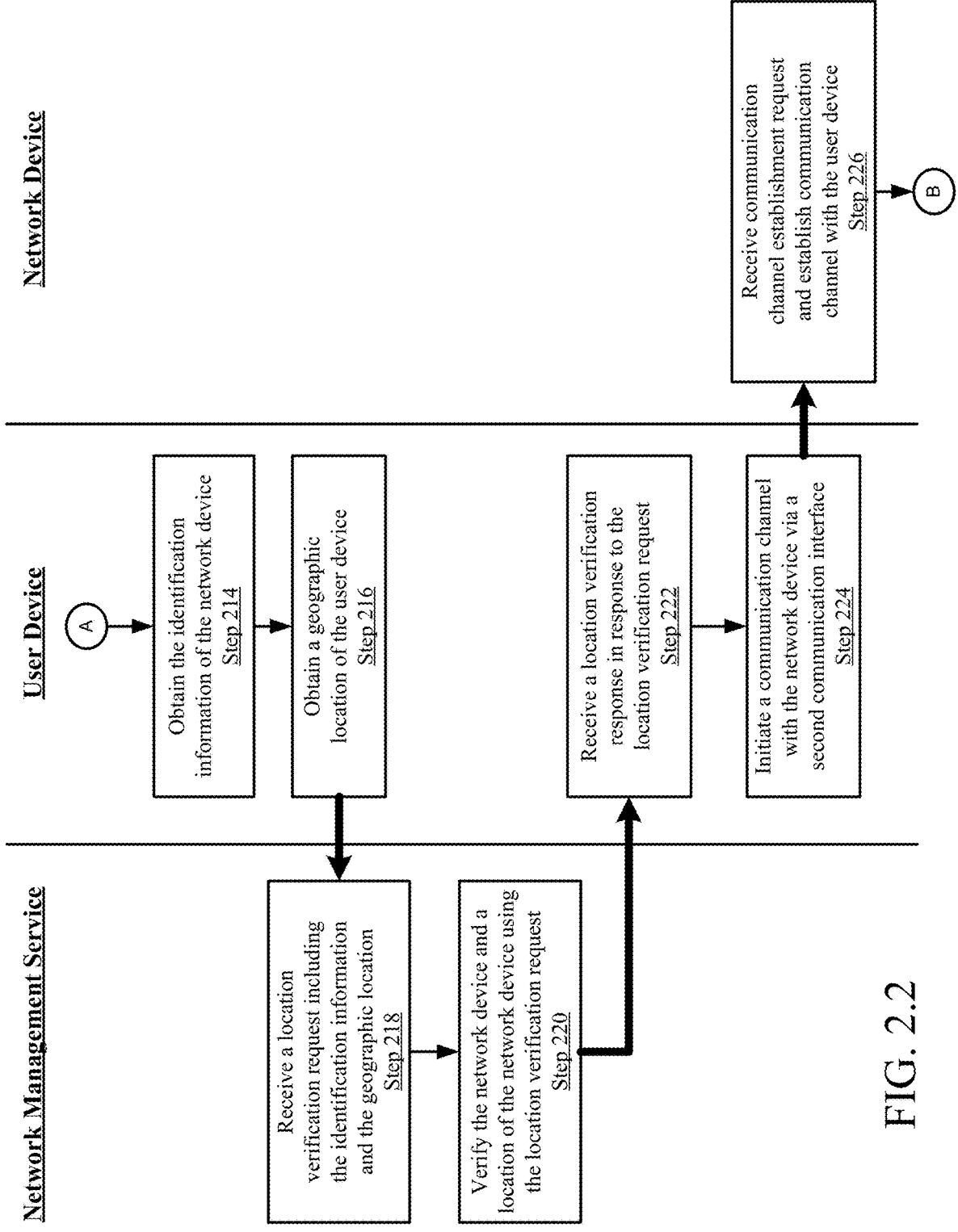
FIG. 2.2

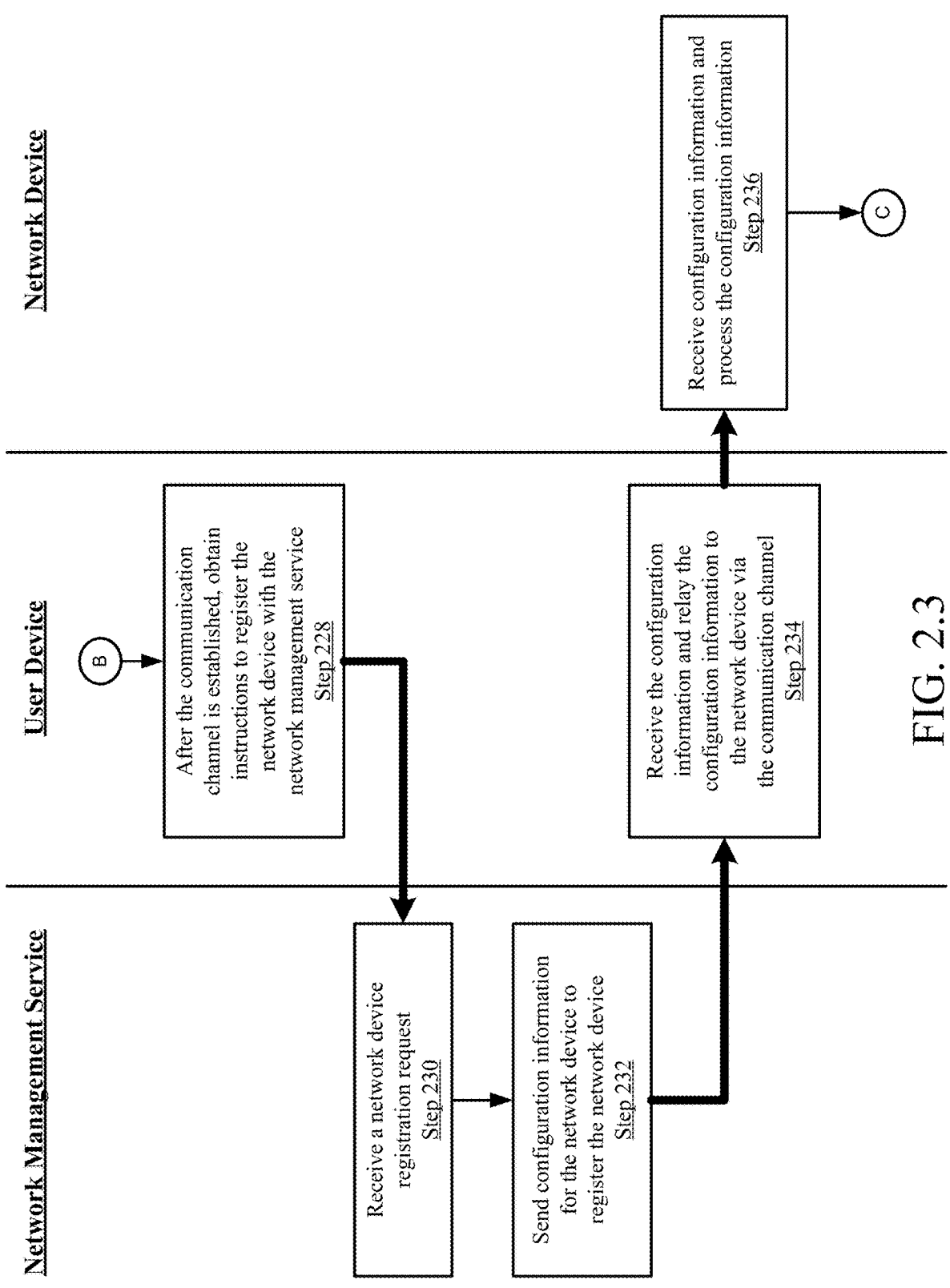
FIG. 2.3

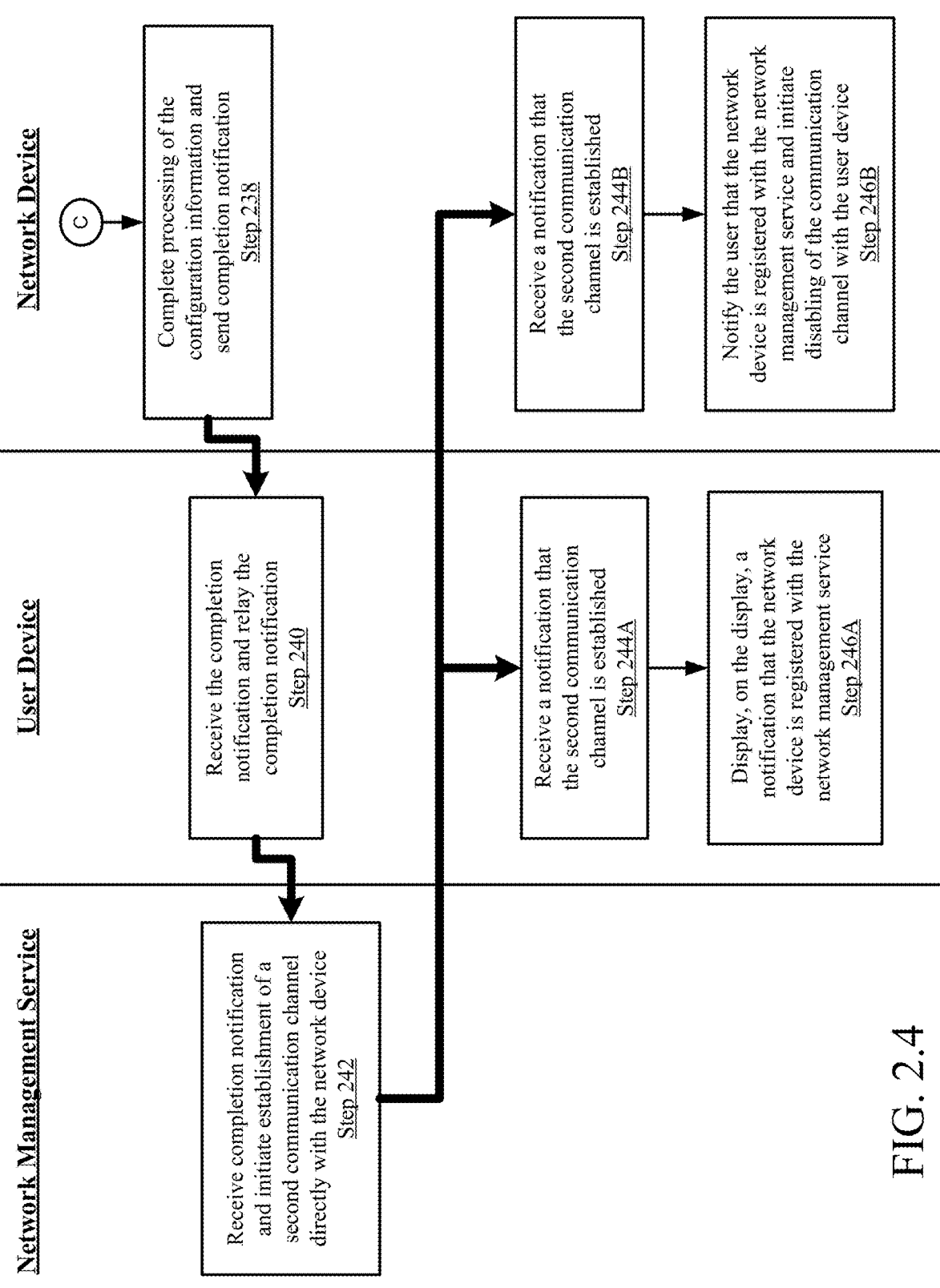
FIG. 2.4

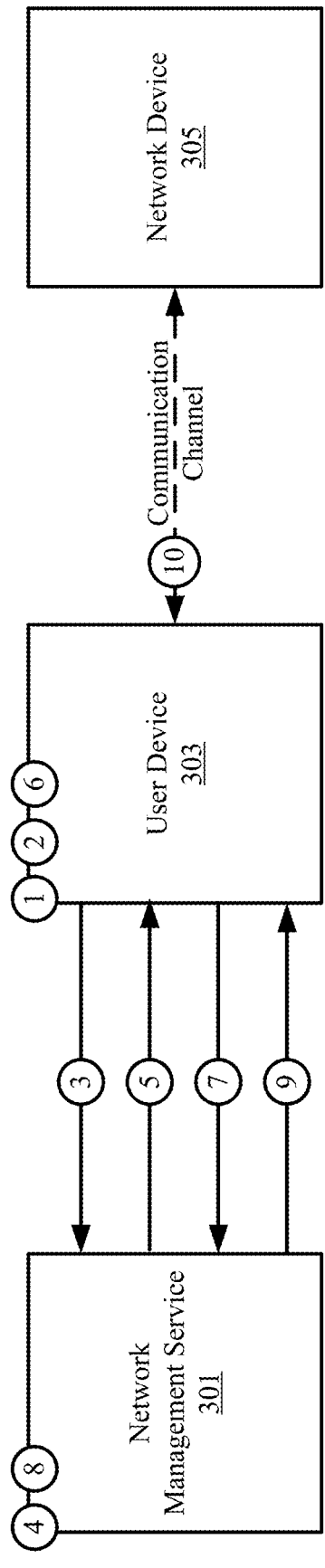
FIG. 3.1

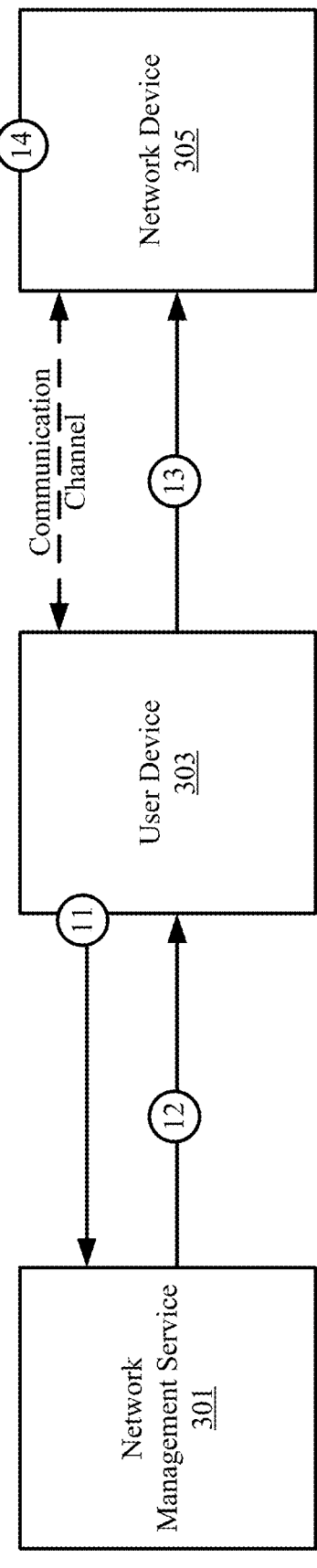
FIG. 3.2

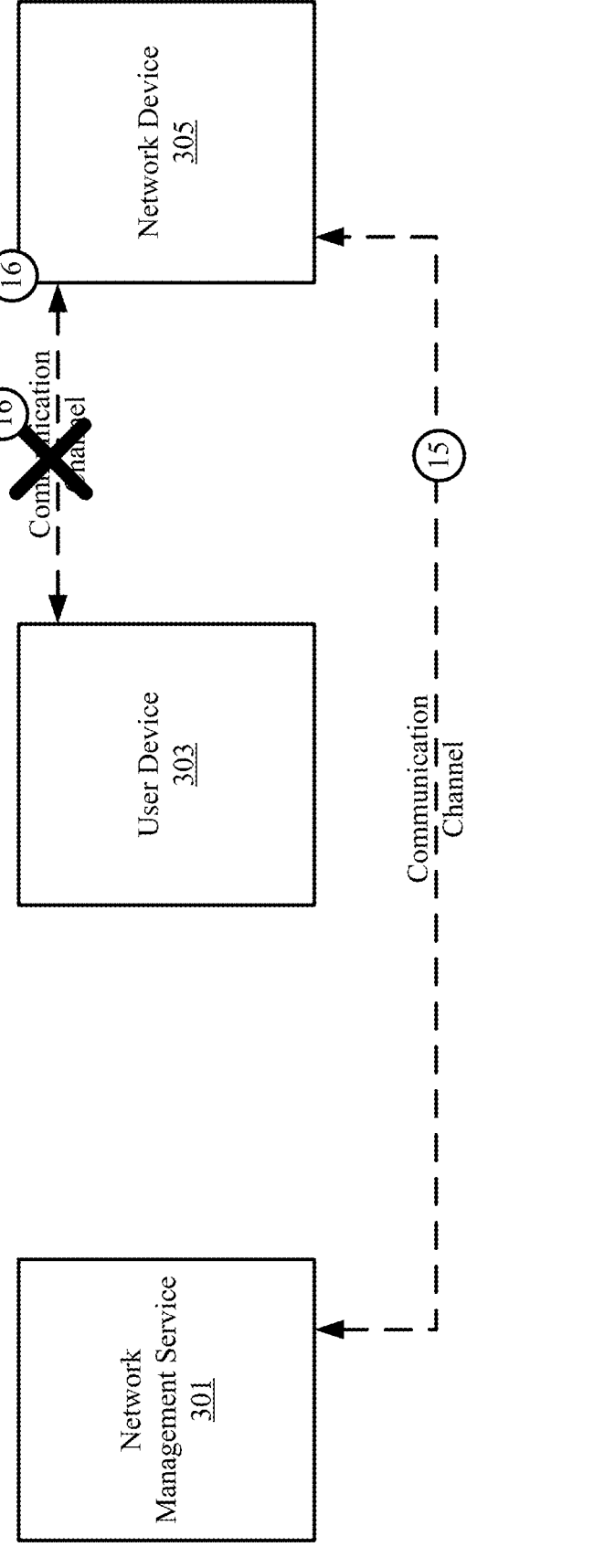
FIG. 3.3

BOOTSTRAPPING AND TROUBLESHOOTING OF REMOTE DEVICES

CROSS-REFERENCE TO RELATED APPLICATIONS

This application claims priority from U.S. Application No. 63/239,555, filed Sep. 1, 2021, the entire contents of which are incorporated herein.

BACKGROUND

A communication system may enable devices to communicate with one another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 1.1 shows a system in accordance with one or more embodiments described herein.

FIG. 1.2 shows a diagram of an example user device in accordance with one or more embodiments disclosed herein.

FIGS. 2.1-2.4 show a flowchart in accordance with one or more embodiments described herein.

FIGS. 3.1-3.3 show an example in accordance with one or more embodiments described herein.

DETAILED DESCRIPTION

Figure 4:
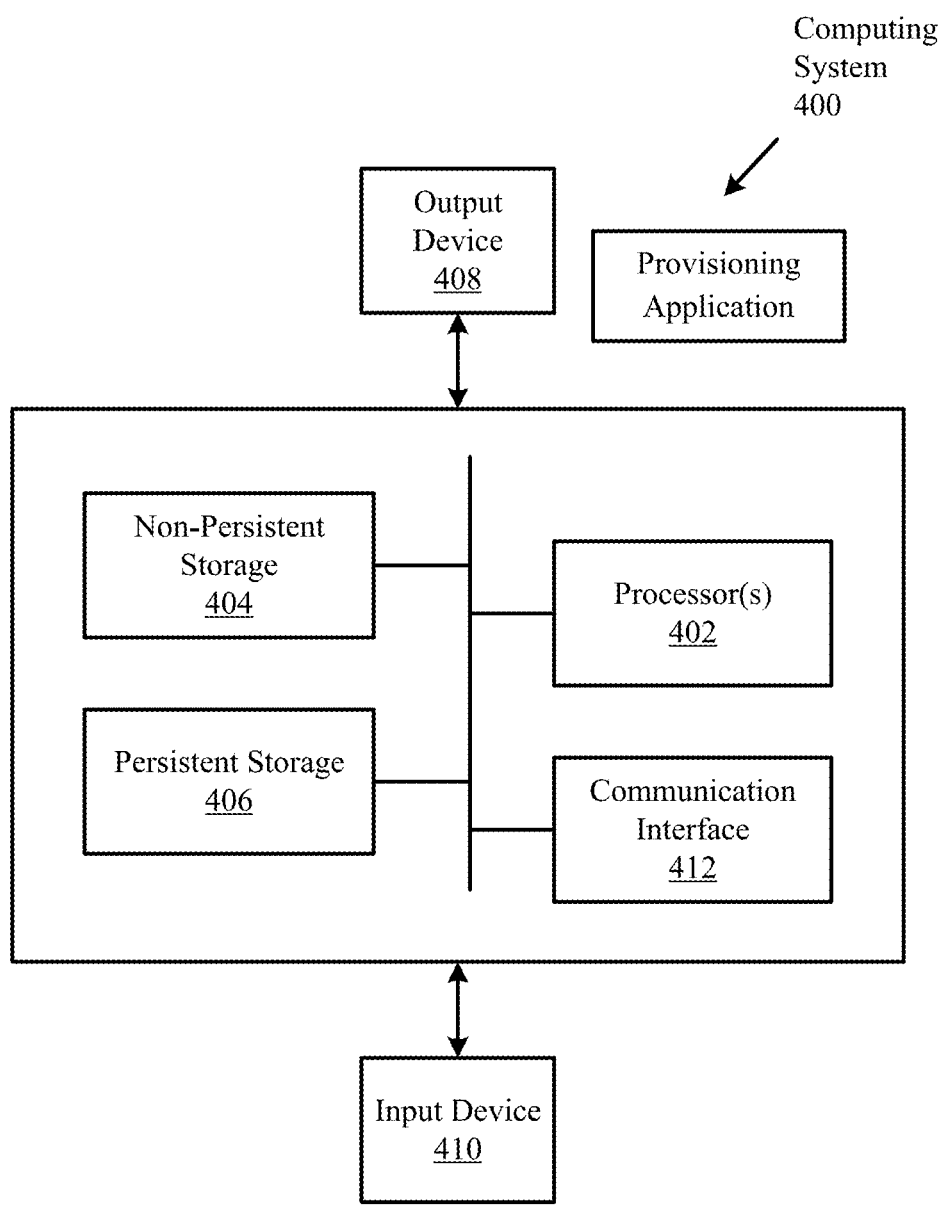
FIG. 4 shows a diagram of a computing device in accordance with one or more embodiments described herein.

Specific embodiments will now be described with reference to the accompanying figures.

Network devices (e.g., branch routers, switches, etc.) are often installed by people (e.g. site managers) at remote sites who have no (or limited) networking expertise. In addition to cabling, these network devices must be configured correctly to connect the site to the rest of a network (e.g., an enterprise network) in a secure manner. However, remote sites (e.g., a customer defined location or a branch office) often lack the specialized equipment (e.g., capable laptop device, a serial cable programmed to operate at a specific frequency and/or an Ethernet cable for secure shell (SSH) connectivity) and computer programs required to connect a network device to a network management service capable of performing operations, administration, maintenance, and provisioning (OAMP) functionalities.

Even when connected and configured properly, a network device may still not be able to connect to the network if dynamic host configuration protocol (DHCP) and other service discovery features are not available. Additionally, a misconfiguration in the network device could result in a security breach. As a result, a provider of the network device must dispatch a more experienced network engineer to troubleshoot the site connectivity and properly configure the network device, which increases deployment costs and complexity for both the customer and the provider.

One or more embodiments disclosed herein provide the ability to remotely bootstrap and/or troubleshoot a network device at sites lacking a professional installer. In particular, one or more embodiments provide a provisioning application (e.g., a smartphone provisioning application) for securely and easily connecting a network device to a network management service that remotely bootstraps/troubleshoots the network device. A non-limiting example topology connection according to one or more embodiments is provided below.

Network management service↔Internet connectivity via cellular or Wi-Fi↔user device (including provisioning application↔Bluetooth®)↔Network device.

Although the above non-limiting example uses cellular or Wi-Fi and Bluetooth® as specific transport mechanism examples, one of ordinary skill in the art would appreciate that other forms of transport mechanisms may be used instead and that the embodiments disclosed herein are not limited to the specific transport mechanism examples shown above.

In one or more embodiments disclosed herein, an installer of the network device will use his/her credentials to log in to the provisioning application on their user device (e.g., a smartphone, a tablet computer, a laptop computer, etc.). The provisioning application will securely connect to a network management service executing on a management server via a first communication interface (e.g., internet connectivity via cellular or Wi-Fi) to authenticate the user (i.e., the installer). Once the user is authenticated, the provisioning application will securely connect, via a communication channel using a second communication interface (e.g., Bluetooth®, a universal serial bus connection, etc.), to the network device. In general, in one or more embodiments: the user device is commonplace and not under the administrative control of provider of the provisioning application; the user device is used to establish connectivity to the network device by the installer; the user device is used by the installer to gain connectivity to the network management service; the user device may never be able to decrypt and see the network device configuration and/or troubleshoot data being sent/received from the network management service; network management service gets increased contextual data about the site location and can verify that the installer has physical access to the network device; and administrator (and or a network engineer) of the network management service can do all functions necessary for the network device to gain admission to the network (namely, when services such as Dynamic Host Configuration Protocol (DHCP) are not available).

In one or more embodiments disclosed herein, the network device will communicate with the network management service, via the provisioning application, to download configurations, upload log files, etc. This way a network administrator located at another location can remotely access the network device using to bootstrap and/or troubleshoot the network device. For example, bootstrapping can be performed using mechanisms such as, but is not limited to: zero-touch provisioning (ZTP), RFC 8572 Secure ZTP, etc. Troubleshooting can be performed using connection mechanisms, including but not limited to: secure shell (SSH), electronic application programming interface (eAPI), etc. Once the network device completes processing of the configurations from the network management service (e.g., is bootstrapped to the network), a second communication channel is established directly between the network device and the network management service such that the network device can communicate directly with the network management service without going through the user device (i.e., the user device is not part of the second communication channel).

In one or more embodiments, once the network device completes processing of the configurations from the network management service (e.g., is bootstrapped to the network), the network device disables its Bluetooth® functionality (i.e., disables the communication channel with the user device). This advantageously adds a layer of security such that the network device can only be accessed by an administrator of the network management service.

In view of the above, one or more embodiments disclosed herein provide, but is not limited to, the following advantages and improvements: the installer of the device does not require any networking experience; the installation process is secure; multiple layers of device and user authentication are provided; and the installation does not require any keyboard/console for troubleshooting; the user device with the provisioning application is the only required equipment.

Various embodiments of the disclosure are described below.

FIG. 1.1 shows a system (100) in accordance with one or more embodiments disclosed herein. The system (100) includes a network management service (101), a user device (103), and a network device (105). Each of these components is described below.

In one or more embodiments disclosed herein, the network management service (101) may provide a combination of services (e.g., network and network device maintenance, monitoring of attached network devices, authentication of an installer of a network device, implementation of upgrades and patches of network device, etc.), and may be executing as software on a server connected to a network. In one or more embodiments, the network management service (101) may be provided by a manufacturer of the network device (105). Alternatively, a provider of the network management service (101) may be different from the manufacturer of the network device (105).

In one or more embodiments, the network management service (101) may be operated by an administrator associated with the manufacturer and/or the provider. The administrator may utilize functions and services of the network management service (101) to remotely (e.g., using zero-touch provisioning (ZTP)) bootstrap a network device (105) being installed at a remote site (e.g., a customer defined location or a branch office) to the network. The administrator may also utilize the functions and services of the network management service (101) to remotely troubleshoot the network device (105). Additional details of the functions and services of the network management service (101) are described below in FIGS. 2.1-2.4.

In one or more embodiments disclosed herein, the user device (103) may be a physical device (e.g., the computing system of FIG. 4) that includes persistent storage, memory (e.g., random access memory), and one or more processor(s). Examples of the user device (103) include, but are not limited to, a smartphone, a laptop computer, a tablet computer, etc. In one or more embodiments, the user device (103) may belong to a user installing the network device (105) at a site remote from a site hosting the server executing the network management service (101).

Additionally, the persistent storage in the user device (103) may include any type of non-transitory computer readable medium that stores data. For example, the data in the persistent storage may be instructions, which, when executed by one or more processor(s) in the user device (103), enable the user device (103) to perform one or more functions of the user device (103) described below in FIGS. 2.1-2.4.

Additional details about the user device (103) are described below in reference to FIG. 1.2.

In one or more embodiments disclosed herein, the network device (105) may be a physical device (e.g., the computing system of FIG. 4) that includes persistent storage, memory (e.g., random access memory), one or more processor(s), and two or more physical ports. Examples of the network device (105) include, but are not limited to, a router, a switch, a top of rack (TOR) switch, and a multilayer switch.

In one or more embodiments, the network device (105) may be disposed at a remote site (e.g., a customer defined location or a branch office).

In one or more embodiments, the persistent storage in the network device (105) may include any type of non-transitory computer readable medium that stores data. For example, the data in the persistent storage may be instructions, which, when executed by one or more processor(s) in the network device (105), enable the network device (105) to perform one or more functions of the network device (105) described below in FIGS. 2.1-2.4.

In one or more embodiments disclosed herein, one or more communication channels may be established between each of the network management service (101), the user device (103), and the network device (105). These communication channels may utilize different types of communication media (e.g., internet connectivity via cellular or Wi-Fi, Bluetooth®, etc.), which allow the network management service (101), the user device (103), and the network device (105) to communicate and transfer data between one another. Establishment of these communication channels is described in more detail below in reference to FIGS. 2.1-3.3.

Turning now to FIG. 1.2, FIG. 1.2 shows a user device (140) in accordance with one or more embodiments of the disclosure. The user device (140) may be the same as the user device (103) described in FIG. 1.1. In addition to the components discussed in reference to FIG. 1.1, the user device (140) further includes: a web provisioning application (142), a first communication interface (144), and a second communication interface (146). The user device (140) may also include a camera (148). Each of the components illustrated in FIG. 1.2 is described below.

In one or more embodiments disclosed herein, the web provisioning application (142) may be a type of application software designed to run on a computing device. For example, the web provisioning application (142) may be, but is not limited to, a smartphone app designed to run on a mobile device such as a smartphone, tablet computer, and/or a laptop computer. In one or more embodiments, the web provisioning application (142) may be developed and provided by the provider of the network management service (101) and/or the manufacturer of the network device (105) as an interface for an installer (i.e., the user) of the network device (105) to remotely communicate with the network management service (101). The web provisioning application (142) may also be configured as an interface for the network management service (101) to communicate with the network device (105). Additional details of the functions and services provided by the web provisioning application are described below in FIGS. 2.1-2.4.

In one or more embodiments disclosed herein, the first communication interface (144) and the second communication interface (146) may each be configured in hardware (e.g., circuitry), software, or any combination thereof. For example, the first communication interface (144) and the second communication interface (146) may each be an integrated circuit (IC) (e.g., a computer chip) or a combination of integrated circuits that enable the user device (140) to utilize one or more types of communication media. In particular, the first communication interface (144) may enable the user device (140) to utilize internet connectivity via cellular or Wi-Fi. The second communication interface (146) may enable the user device (140) to enable Bluetooth® communications.

In one or more embodiments disclosed herein, the user device (140) may include the camera (148) for recording visual images in the form of photographs, film, or video signals. The camera (148) may also be used to scan labels (e.g., quick response (QR) codes, bar codes, etc.) provided on surfaces of other devices (e.g., the network device (105)). In one or more embodiments, the user device (140) may not include the camera (148).

One skilled in the art will recognize that the architecture of the system (100) and of the network device (120) is not limited to the components shown in FIGS. 1.1 and 1.2. For example, system (100) may include multiple ones of the network device (105) being installed. Further, the user device (140) may include components (e.g., a processor, persistent storage, a display, etc.) not shown in FIG. 1.1.

FIGS. 2.1-2.4 show a flowchart of a method in accordance with one or more embodiments of the disclosure. The method depicted in FIGS. 2.1-2.4 may be performed to configure a network device (e.g., 105, FIG. 1.1). The method shown in FIGS. 2.1-2.4 may be performed by, for example, a combination of the network device, the network management service (e.g., 101, FIG. 1.1), and the user device (e.g., 103, FIG. 1.1; 140, FIG. 1.2).

While the flowchart in FIGS. 2.1-2.4 is illustrated as a series of steps, any of the steps may be omitted, performed in a different order, additional steps may be included, and/or any or all of the steps may be performed in a parallel and/or partially overlapping manner without departing from the disclosure.

Initially, in Step 200, the user device receives instructions to execute a web provisioning application (WPA) (e.g., 142, FIG. 1.2). The instructions may be received in response to a user (e.g., an installer of the network device) opening the web provisioning application on the user device. In one or more embodiments, the network device may include an instruction manual and/or instruction sheet with instructions for the user to download and install the WPA onto the user device.

In Step 202, the user device transmits a request via a first communication interface (e.g., 144. FIG. 1.2) to access the network management service. In one or more embodiments, the first communication interface is internet connectivity via cellular or Wi-Fi. Additionally, the request may be transmitted in response to the user opening the WPA on the user device. Alternatively, the request may be transmitted in response to the user selecting a "request connection to network management service" option displayed on a graphical user interface (GUI) of the WPA.

In one or more embodiments, at this point, the user has not yet logged into the WPA and cannot access any of the functions and services of the WPA aside from requesting connection to the network management service.

In Step 204, in response to receiving the access request from the user device, the network management service generates user verification instructions and transmits the user verification instructions to the user device. In one or more embodiments, the user verification instructions may include a one-time uniform resource locator (URL) granting access to a user login page and instructions for the user device to display the one-time URL on the GUI of the WPA.

The user verification instructions may also include instructions for causing the user device to display a set of login instructions on the GUI.

In Step 206, upon receiving the user verification instructions from the network management service, the user device displays the user verification instructions to the user via the GUI of the WPA. For example, in one or more embodiments, the user is presented with the one-time URL generated in Step 204. The user may then use the one-time URL to access a login page that allows the user to log in to the WPA using the user's credentials. In one or more embodiments, the log in process may utilize multi-factor authentication (MFA) such as, but is not limited to, using a separate code sent through text message SMS (short messaging service) along with the user's password, a biometric authentication, a user-specific personal identification number (PIN), etc. Other forms of MFA may include, but are not limited to: user ID/Password, single sign on (SSO), SMS or Email secondary authentication, one-time URL sent via SMS, and GPS or reverse internet protocol (IP) lookup location services.

In Step 208, the user device obtains user verification information from the user and transmits the user verification information to the network management service. In one or more embodiments, as discussed above in Step 206, the user verification information may include the user's credentials (e.g., a pre-set username and password). If MFA is enabled, the user verification information would also include any additional information required for by the MFA.

In Step 210, the network management service receives the user verification information and verifies the user verification information. In one or more embodiments, the network management service may verify the user verification information against existing information on the user stored within a database of the network management service. This process allows the network management service to authenticate the user and verify that the user is someone who is authorized to install the network device. Once the user verification information is verified, the user is logged into the WPA and the WPA now has full access to the functions and services of the network management service. Alternatively, in one or more embodiments, the WPA may only be provided with partial access to the functions and services of the network management service. Additionally, in one or more embodiments, as an additional factor of authentication, once the user is logged into the WPA, a socket is established between the WPA and the user device and a certificate is presented to the user device from the web provisioning application.

In Step 212, once the user is successfully verified and has logged into the WPA, the user device receives instructions to obtain identification information of the network device from the network management service. In one or more embodiments, the instructions to obtain identification information of the network device may include a set of detailed steps for the user to follow for obtaining the identification information. The set of detailed steps are displayed on the GUI of the WPA.

In Step 214, in response to receiving the instructions to obtain the identification information of the network device, the user device receives the identification information of the network device from the user. In one or more embodiments, the identification of the network device may be any type of information that can be used to identify and authenticate the network device. For example, the identification may be, but is not limited to, one or more of unique identification (ID) (e.g., a model number, a serial number, etc.), a QR code, a barcode, etc.

In one or more embodiments, as a non-limiting example, the set of detailed steps received in Step 212 may include a step instructing the user to scan (through the WPA) a QR code of the network device using the camera of the user device. In one or more embodiments, as another non-limiting example, the user may be instructed to enter site information (e.g., an address) of the site at which the network device is being installed.

In Step 216, the user device obtains a geographic location of the user device and transmits the identification information of the network device and the geographic location to the network management service as part of a request for location verification. In one or more embodiments, the geographic location may be obtained automatically by the user device using the current geographical positioning system (GPS) coordinates of the user device. The user device may obtain the geographical location within a predetermined time after receiving the instructions to obtain the identification information of the network device in Step 214. This geographic location of the user device is used to verify that the network device is indeed at a correct installation site. For example, if the network device is stolen during delivery and being installed at a different location, the network management service will be able to prevent installation of the network device by determining that the user device is not at the correct installation location (i.e., installation site).

Although the above example uses a GPS coordinate of the user device to confirm that the network device is being installed at a correct location, one of ordinary skill in the art would appreciate that other forms or authentication and/or information may be used to authenticate a location of the network device and/or user device without departing from the scope of one or more embodiments disclosed herein.

In Step 218, the network management service receives the location verification request from the user device. In one or more embodiments, the location verification request may include any combination of the identification information of the network device and the geographic location. This information received by the network management service is then used in Step 220 to confirm that the network device is physically at the correct installation location (i.e., to verify a location of the network device). For example, the network management service may compare the site information (e.g., an address) entered by the user to the GPS coordinates automatically obtained by the user device to determine whether these two pieces of information match or are within a predetermined distance of one another.

Additionally, in Step 220, the make, model, and other properties of the network device are verified by the network management service using the information included as part of the identification of the network device. This process ensures that the correct type of network device is being installed at the installation site. In one or more embodiments, the network device cannot be installed (e.g., the WPA prevents installation of the network device) if the network management service fails to successfully verify either one of the network devices or the location of the network device.

In Step 222, once the network management service successfully verifies the network device and the location of the network device, the user device receives a location verification response in response to the location verification request sent in Step 216. In response to receiving the location verification response, the user device initiates (in Step 224) a communication channel with the network device via a second communication interface (e.g., 146, FIG. 1.2). In one or more embodiments, the second communication interface is Bluetooth®.

In one or more embodiments, the communication channel with the network device may be initiated by the user device transmitting a communication channel establishment request to the user device. In Step 226, the network device receives the communication establishment request from the user device and establishes the communication channel with the user device. Consequently, once the communication channel between the user device and the network device is established, the two devices may communicate with one another using Bluetooth®.

Turning now to Step 228, after the communication channel is established between the user device (namely, the WPA of the user device) and the network device, the user device obtains instructions to register the network device with the network management service. In one or more embodiments, the instructions to register the network device with the network management service may be obtained in response to the user pressing a "register" option on the GUI of the WPA. In response to receiving the instructions to register the network device, the user device transmits a network device registration request to the network management service. This network device registration request starts the process for bootstrapping the network device to the network management service and the network.

In Step 230, the network management service receives the network device registration request from the user device via the first communication interface of the user device. In response to receiving the network device registration request, the network management service (in Step 232) generates configuration information required for the network device to be registered with the network management service, and transmits the configuration information to the user device using the first communication interface of the user device.

In one or more embodiments, the configuration information for the network device may include one or more sets of instructions and/or configuration files for: (i) bootstrapping the network device to the network and the network management service; and (ii) updating the firmware of the network device to include the latest updates available within the databases of the network management service. For example, assume that the original factory settings of the network device do not include any functions (e.g., dynamic host configuration protocol (DHCP) and/or other service discovery features) that enable the network device to automatically connect to the network. As a result, even if the network device is properly set up and connected by the user, the network device will still not be able to reach the network management service through the network.

In Step 234, the user device receives (e.g., via the WPA) the configuration information from the network management service and relays the configuration information to the network device via the communication channel that uses the second communication interface of the user device. At this point, because the network device is fully registered with (i.e., fully bootstrapped to) the network management service, the user device acts (e.g., via the WPA) as a relay point for relaying information (e.g., configuration files) from the network management service to the network device. Furthermore, at this point, all communications between the user device and the network management service are relayed using the first communication interface (i.e., internet connectivity via cellular or Wi-Fi) of the user device, and all communications between the user device and the network device are relayed using the second communication interface (i.e., Bluetooth®) of the user device.

In Step 236, the network device receives the configuration information from the user device and processes the configuration information. In one or more embodiments, while processing the configuration information, the network device may transmit information (e.g., bootstrap logs) to the user device for the user device to relay to the network management service. This allows an administrator of the network management service to examine the bootstrap logs and troubleshoot (if necessary) the network device. In one or more embodiments, the administrator may troubleshoot the network device by transmitting commands for the network device to execute to the network device through the user device (e.g., via the WPA). In one or more embodiments, data (e.g., the bootstrap logs, telemetric state data, etc.) from the network device may be transmitted to the network management service through an encrypted channel on (i.e., established by) the user device such that the administrator of the network management service may conduct an interactive session with the network device.

In Step 238, upon completion of the processing of the configuration information (i.e., once the network device is successfully bootstrapped to the network management service and fully updated), the network device transmits a completion notification to the user device via the communication channel. In response to receiving the completion notification, the user device (in Step 240) relays the completion notification to the network management service using the first communication interface of the user device.

In one or more embodiments, prior to the network device connecting to (i.e., being successfully registered with) the network management service, a secure boot of the network device (e.g., program clock reference (PCR) measurements and hashes of boot images, etc.) may be passed back to the network management service for verification of a device secure boot prior to any credentials passing to the network device from the network management service.

In Step 242, the network management service receives the completion notification and initiates an establishment of a second communication channel directly with the network device. In one or more embodiments, the second communication channel utilizes internet connectivity communication interfaces (e.g., wired Ethernet connections) of the network management service and the network device. In one or more embodiments, once the second communication channel is established between the network management service and the network device, the network management service transmits a registration completion notification to each of the user device (via the first communication interface of the user device) and the network device (via the second communication channel). At this point, the network device is directly connected to and may directly communicate with the network management service using the second communication channel without using the user device as a relay device.

In Step 244A, the user device receives (e.g., via the WPA) the registration completion notification from the network management service that the second communication channel is established. In response, in Step 246A, the user device displays on the GUI of the WPA, a notification to the user that the network device is successfully registered with the network management service.

Concurrently, or at any time before or after Step 244A, the network device receives the registration completion notification from the network management service via the second communication channel in Step 244B. In response, the network device notifies the user that the network device is successfully registered with the network management service and initiates a disabling of the communication channel with the user device.

In one or more embodiments, the network device notifies the user of the successful registration by turning on certain lights on a casing of the network device. For example, a light labeled "registered" or "connected" on the casing of the network device may be activated (e.g., turned on). Other forms of notifying the user may be utilized without departing from the scope of this disclosure.

Additionally, in one or more embodiments, the network device initiates disabling of the communication channel with the user device by disabling a Bluetooth® functionality of the network device. Consequently, the network device is no longer discoverable via Bluetooth® by any other devices, which prevents non-authorized individuals from connecting and attempting to configure the network device using other Bluetooth® enabled devices. In one or more embodiments, the Bluetooth® functionality of the network device may only be re-enabled through a factory system reset of the network device. The factory system reset is possible following preset hardware reset procedures developed by the manufacturer of the network device and/or the provider of the network management service.

To further clarify embodiments of the disclosure, a non-limiting working example is provided in FIGS. 3.1-3.3.

Start of Example

Initially, assume that a network device (305) is being installed at a remote site (e.g., a customer defined location or a branch office) by a user (e.g., an installer of the network device). Further assume that the remote site is located in a different geographical location (e.g., in a different city, state, or country) from the closest site of a provider of the network management service (301) and/or the manufacturer of the network device (305). Even further, assume that the network device is in a factory default state requiring configuration (i.e., installation) prior to the network device being able to be bootstrapped to a network, and that the user has no prior experience installing network devices.

In FIG. 3.1, the user installs a web provisioning application associated with the network management service (301) on a user device (303) [1]. The user logs into the web provisioning application using user verification information [2]. The user verification information is transmitted to the network management service (301) via a first communication interface of the user device (303) [3]. In response to receiving the user verification information, the network management service verifies the user using the user verification information [4].

Once the user is verified, the network management service (301) transmits a user verification response specifying that the user is verified to the user device (303) via the first communication interface of the user device (303) [5]. In response to receiving the user verification response, the user device (303) obtains identification information of the network device (305) and geographic location of the user device (303) [6]. The user device (303) transmits the identification information and geographic location in a location verification request to the network management service (301) [7]. The network management service (301) verifies an identity of the network device (305) and that the network device (305) is at a correct geographical location (e.g., a planned installation site) using the identification information and geographic location [8].

Once the verification is complete, the network management service (301) transmits a location verification response specifying that the network device (305) is verified to the user device (303). In response to receiving the location verification response, the user device (303) initiates a communication channel with the network device (305) using the second communication interface of the user device (303) [10].

Turning now to FIG. 3.2, after the communication channel is established between the user device (303) and the network device (305), the user device (303) obtains (e.g., from a user and through the web provisioning application) a request to register the network device (305) with the network management service (301) and transmits a registration request to the network management service (301) [11]. In response to the registration request, the network management service (301) sends configuration information for the network device (305) to the user device (303) via the first communication interface [12]. The user device (303) relays the configuration information to the network device (305) via the communication channel using the second communication interface [13]. The network device (305) receives the configuration information and processes the configuration to complete registration with the network management service (301) [14].

Finally, as shown in FIG. 3.3, after processing the configuration information, the network device (305) is registered with the network management service (301) and a new communication channel is directly established between the network device (305) and the network management service (301) [15]. After the new communication channel is established, the network device (305) disables the communication channel with the user device (303) by disabling a Bluetooth® functionality of the network device (305) [16].

End of Example

As discussed above, embodiments disclosed herein may be implemented using computing devices. FIG. 4 shows a diagram of a computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth® interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing device.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for remotely configuring a network device using a user device having a first communication interface and a second communication interface, the method comprising:

obtaining, by the user device, identification information of the network device;

sending, by the user device using the first communication interface, a verification request to a network management service, wherein the verification request comprises the identification information and comprises additional information usable to verify an installation location of the network device;

receiving, by the user device and in response to the verification request, a verification response from the network management service, wherein the verification response is indicative of the identification information of the network device and the installation location of the network device having been verified;

initiating, by the user device and after receiving the verification response, a communication channel between the user device and the network device using the second communication interface;

after the communication channel is established:

obtaining, by the user device via the first communication interface, configuration information for the network device from the network management service;

sending, by the user device, the configuration information to the network device via the communication channel, wherein the user device is configured as a pass-through device that relays the configuration information from the network management service to the network device;

receiving, by the user device, a registration completion notification from the network management service indicating establishment of an additional communication channel between the network management service and the network device without using the user device as the pass-through device; and after receiving the registration completion notification, disabling the communication channel between the user device and the network device.

2. The method of claim 1, wherein the configuration information is sent to the network device as part of a bootstrapping operation using zero-touch provisioning (ZTP) or Secure ZTP.

3. The method of claim 1, wherein the additional information comprises geographic location obtained by the user device, the geographic location comprising:

a global position system (GPS) location of the user device, or an address of an installation site of the network device.

4. The method of claim 1, wherein the network device is a router, a top of rack switch, or a multilayer switch.

5. A method for remotely configuring a network device using a user device that includes a first communication interface and a second communication interface, the method comprising:

initiating, by the user device, establishment of a communication channel with the network device using the second communication interface, wherein the user device is in communication with a network management service via the first communication interface;

after the communication channel is established:

obtaining, by the user device via the first communication interface, configuration information for the network device from the network management service;

sending, by the user device, the configuration information to the network device via the communication channel;

receiving, by the user device via the communication channel and from the network device, a log when the configuration information is being processed by the network device; and providing, by the user device, the received log to the network management service, wherein the user device is configured as a pass-through device that relays the configuration information from the network management service to the network device and that relays the log from the network device to the network management service;

before initiating establishment of the communication channel with the network device:

obtaining, by the user device, identification information of the network device and a geographic location of the user device;

sending, by the user device using the first communication interface, a location verification request that includes the identification information and the geographic location to the network management service; and receiving, by the user device and in response to the location verification request, a location verification response from the network management service.

6. The method of claim 5, wherein the first communication interface comprises internet connectivity via cellular or Wi-Fi, and the second communication interface comprises Bluetooth.

7. The method of claim 5, wherein the identification information of the network device is obtained from an optical label on the network device.

8. The method of claim 5, wherein:

the geographic location comprises:

a global position system (GPS) location of the user device; or an address of an installation site of the network device, and the geographic location is obtained within a predetermined time of obtaining the identification information of the network device.

9. The method of claim 5, wherein the method further comprises, before obtaining the identification information of the network device:

obtaining, by the user device, user verification information;

sending, by the user device using the first communication interface, a user verification request to the network management service, wherein the user verification request comprises the user verification information;

receiving, by the user device and in response to the user verification request, a user verification response from the network management service specifying successful user verification, wherein the user verification response further comprises instructions to obtain the identification information of the network device.

10. The method of claim 9, wherein the method further comprises, before obtaining the user verification information:

receiving, from the network management service and in response to initiating a web provisioning application associated with the network management service on the user device, instructions to perform user verification; and displaying, by the user device on a display of the user device and in response to receiving the instructions, a user login screen for inputting the user verification information.

11. The method of claim 5, wherein:

prior to processing the configuration information, the network device does not communicate directly with the network management service, and after the network device has processed the configuration information, the network device establishes a second communication channel with the network management service.

12. The method of claim 11, wherein:

the user device is not part of the second communication channel, the network management service directly transmits commands to the network device via the second communication channel, and the commands comprise a command for updating the network device.

13. The method of claim 5, wherein the network device initiates disabling of the communication channel after processing the configuration information.

14. The method of claim 13, wherein the network device initiates disabling of the communication channel by disabling a Bluetooth functionality of the network device, and once the Bluetooth functionality is disabled, the Bluetooth functionality can only be re-enabled through a factory system reset by a manufacturer of the network device.

15. The method of claim 5, wherein after the network device has processed the configuration information, the network device establishes a second communication channel with the network management service and wherein the second communication channel is via an Ethernet connection of the network device.

16. A user device for remotely configuring a network device, the user device comprising:

a first communication interface;

a second communication interface; and a processor coupled to a storage, wherein the processor is configured to, through a web provisioning application executing on the user device:

provide user verification information to a network management service via the first communication interface;

based on the user verification information being verified by the network management service, receive instructions to obtain identification information of the network device;

initiate a communication channel with the network device using the second communication interface;

after the communication channel is established, relay configuration information for the network device received from the network management service to the network device via the communication channel;

before the initiation of the communication channel with the network device and after the reception of the instructions:

obtain the identification information of the network device and additional information usable to verify an installation location of the network device;

send, using the first communication interface, a verification request that includes the identification information and the additional information to the network management service; and receive, in response to the verification request, a location verification response from the network management service.

17. The user device of claim 16, wherein the first communication interface comprises internet connectivity via cellular or Wi-Fi, and the second communication interface comprises Bluetooth.

18. The user device of claim 16, wherein:

prior to processing the configuration information, the network device does not communicate directly with the network management service, and after the network device has processed the configuration information, the network device establishes a second communication channel with the network management service.

19. The user device of claim 18, wherein:

the user device is not part of the second communication channel, the network management service directly transmits commands to the network device via the second communication channel, and the commands comprise a command for updating the network device.

20. The user device of claim 16, wherein:

the network device is configured to initiate disabling of the communication channel after processing the configuration information by disabling a Bluetooth functionality of the network device, and once the Bluetooth functionality is disabled, the Bluetooth functionality can only be re-enabled through a factory system reset by a manufacturer of the network device.

* * * * *